June 24, 1930. D. J. CARA ET AL 1,768,437
AWNING FOR LOCOMOTIVE CABS
Filed July 8, 1927
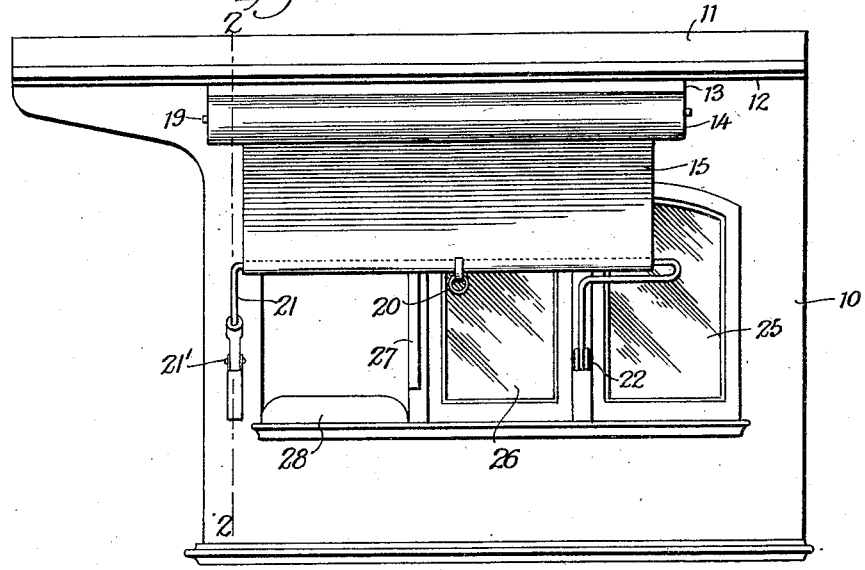
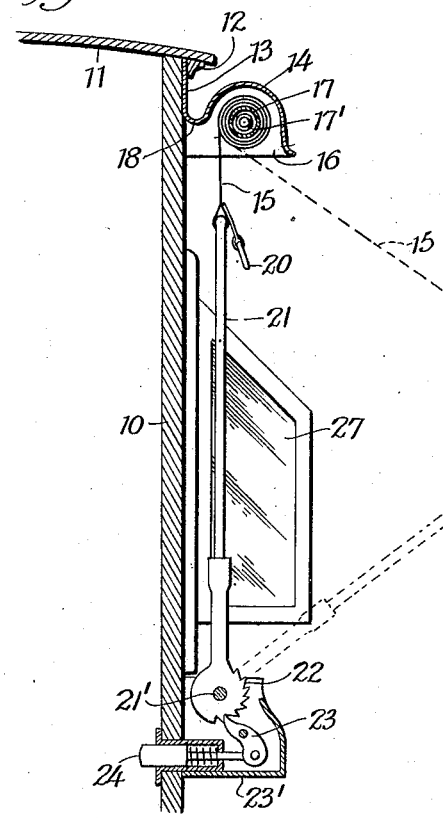
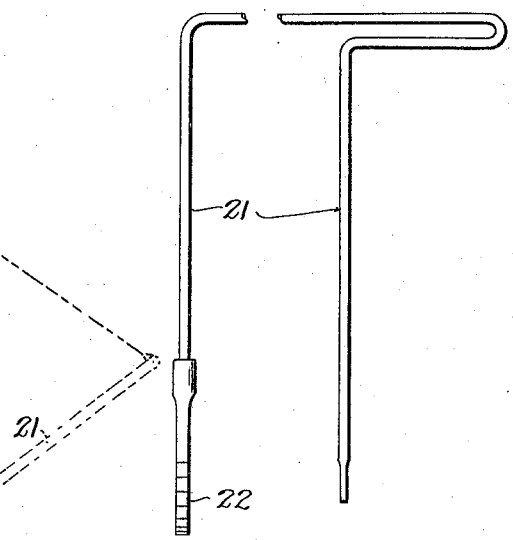
Inventor
Dominick J. Cara,
James W. Hough,
By John W Farley
Attorney Patented June 24, 1930

1,768,437

UNITED STATES PATENT OFFICE

DOMINICK J. CARA AND JAMES W. HOUGH, OF MEMPHIS, TENNESSEE

AWNING FOR LOCOMOTIVE CABS

Application filed July 8, 1927. Serial No. 204,171.

Our said invention relates to an awning for locomotive cabs, and it is an object thereof to provide a device of this character which can be raised from the inside of the cab.

The conventional opening in a round house is not wide enough to permit the engine to get into the round house if the awning is down. Men have been hurt trying to put up one of the old type awnings by having the awning strike the side of the round house door while the engine is moving into the round house. Therefore, the feature of this invention of being able to raise this awning without the engineer or fireman putting his arm or hand outside the window is of particular value. This awning is an improvement over all others in that it is possible for the engineer before leaving his seat in the cab of the engine to simply press on the plunger. In other awnings now in use on locomotives, they are frequently torn off when the engines are not put in the roundhouses because they are not pulled up. This last feature is of particular commercial value for the reason that it prevents damage, as the engineer without leaving his seat can cause the awning to be rolled up so there will be no danger of the frame as it extends out from the cab striking anything and tearing the awning off. Furthermore by rolling it up, when the engine is in the yards, the awning is protected from cinders, sparks, weather and other damage.

The construction of this awning is such that it can be raised up out of position with the window of the cab closed. It is of particular advantage to have it so that the engineer may roll the awning up out of position by simply pressing on the plunger when the train is pulled into the yards for the reason that the vision of the engineer should be both forward and sidewise in observing switches and other trains in the yards.

Another object is to provide a hood that is weather tight against the side of the cab and projects over far enough so that water from the hood will fall on the outstretched awning.

Another object is to provide a hood such that the roller and all of that part of the awning around the roller is protected from sparks. When sparks fell on the old awning they would burn it up. By having a spring in the roller to which the awning is attached and a frame that is attached to the lower end of the awning so that the awning is kept out without any sag in it, the danger of burning the awning by sparks falling on it is reduced to a minimum. This hood by covering the awning when it is not in actual use increases the life of the awning. The awning cannot deteriorate from weather or be burned by cinders or torn off when it is rolled up in this hood.

Another object is to so construct the device that the out-stretched awning can be held at any angle in relation to the cab so that if the sun is in a certain position at a certain hour of the day, the awning may be regulated accordingly. The ratchet and the frame that holds the awning down will hold it positively in any such position. The hood protects the roller to which is attached the cloth that constitutes the awning, therefore, when the cloth of the awning wears out it can be renewed with a minimum amount of cost or labor.

Another object is to provide a locomotive awning that will not rattle and for this purpose it is made with a minimum number of parts so constructed as to be practically noiseless at all times.

Another object is to provide an awning of this type which shall be weather proof.

Still another object of particular importance is to provide an awning that has no substantial wind resistance, the device being so made that it cuts through the air with merely an edge cutting action. This not only keeps down the wind resistance such as would strain the awning and its supporting means, but also makes it self-clearing in very effective manner, as any rain, sleet, snow, sparks, cinders, etc., are at once swept off the awning by the air current caused by the movement of the awning edgewise through the air. The shape of the hood is such also that the said air currents keep it clear of accumulations of dirt, cinders, snow, etc., which makes for good appearance and keeps the awning in condition for effective operation.

Referring to the drawings, which are made a part of this application and in which similar reference characters indicate similar parts:

Fig. 1 is a side elevation of part of a locomotive cab with my invention applied thereto.

Fig. 2, a section on line 2—2 of Fig. 1, and

Fig. 3, a detail of the supporting bow for the awning.

In the drawings, reference character 10 indicates the side wall of a locomotive cab having a roof 11, here shown as provided with a molding 12 holding in place the vertical attaching part 13 of the hood 14 of the awning 15. The hood is closed at the ends as shown at 16, to keep the weather off the roller 17 and off the awning when the same is rolled up. The hood is so bent as to provide a groove or gutter 18 open from end to end, the groove and the entire top of the hood being thus cleaned by the air current due to the movement of the locomotive.

The roller 17 has a spring 17' of any ordinary type for rolling up the awning, and is held in brackets of suitable form inside the hood, the brackets being fastened by bolts 19. A ring 20 is pivotally attached to the outer edge of the awning proper for raising and lowering the same. This awning is made of heavy waterproof material, such as will be waterproof and not easily injured by cinders or in other ways.

A bow 21 is pivoted at 21' and 22 on brackets attached to the cab frame one of which is shown in detail at 23 in Fig. 2. The intermediate part of the bow engages the outer or lower end of the awning proper or shade 15. One arm of the bow has ratchet teeth 22 thereon arranged to coact with a pawl 23' which is pivotally connected to a plunger 24 extending through the wall of the cab. A spring 24' holds the pawl in the position indicated. It will be seen that the engineer can reach out and pull the awning down to desired position, where it will be held by the pawl, and that it can be released by pressure on the plunger from the inside of the cab, when it will instantly assume the position shown in full lines in Fig. 2. This can be done by the engineer without leaving his seat back of the arm rest 28.

The window 25, the sliding window 26 the pivoted transparent shield 27, and a suitable sliding window, (not shown) for closing the opening adjacent the arm rest 28 are or may be all of conventional form.

It will be obvious to those skilled in the art that various modifications may be made in our device without departing from the spirit of the invention and therefore we do not limit ourselves to what is shown in the drawings and described in the specification but only as indicated in the appended claims.

Having thus fully described our said invention what we claim as new and desire to secure by Letters Patent is:

1. In an awning for a locomotive cab including a spring roller adapted to be secured over the window of the cab and a shade on said roller, a substantially U-shaped bow adapted to be pivotally mounted on the cab adjacent the lower portion of the window, said bow comprising a straight longitudinal member adapted to have the free end of the shade secured thereto, said member having a return-bend at one end, and transverse arms of the bow forming extensions of said return-bend and of the other end of said straight member whereby a shade of greater width than the distance between the transverse arms may be secured to the bow.

2. In an awning for a locomotive cab, including a spring roller adapted to be secured over the window of the cab, and a shade on said roller, a bow adapted to be pivotally mounted on the cab adjacent the lower portion of the window, said bow comprising a straight longitudinal member adapted to have the end of the shade secured thereto, said member having a return-bend at one end, and transverse arms of the bow forming extensions of said return-bend and of the other end of said straight member, whereby a shade of greater width than the distance between the transverse arms may be secured to the bow, and means for securing said bow in adjusted position comprising a ratchet carried by one pivoted extremity of the bow, a pawl pivotally supported adjacent said ratchet and adapted to engage the same, and a spring pressed plunger connected to said pawl and extending into the inside of the cab and adapted to be operated to quickly disengage the pawl from the ratchet and permit the shade to rewind.

In testimony whereof we affix our signatures.

DOMINICK J. CARA.
JAMES W. HOUGH.